United States Patent
Kadouchi et al.

(10) Patent No.: US 7,501,793 B2
(45) Date of Patent: Mar. 10, 2009

(54) BATTERY RECEIVING DEVICE, POWER SOURCE DEVICE USING THE SAME, AND ELECTRIC MOTOR VEHICLE USING THE DEVICES

(75) Inventors: Eiji Kadouchi, Aichi (JP); Kenji Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/523,972

(22) PCT Filed: Apr. 21, 2004

(86) PCT No.: PCT/JP2004/005687

§ 371 (c)(1),
(2), (4) Date: Feb. 8, 2005

(87) PCT Pub. No.: WO2004/095621

PCT Pub. Date: Nov. 4, 2004

(65) Prior Publication Data

US 2005/0242782 A1    Nov. 3, 2005

(30) Foreign Application Priority Data

Apr. 24, 2003    (JP) ............................. 2003-120010

(51) Int. Cl.
*H02J 7/00* (2006.01)
(52) U.S. Cl. ...................................... 320/107; 320/150
(58) Field of Classification Search ................. 320/107, 320/112, 150
See application file for complete search history.

(56) References Cited

U.S. PATENT DOCUMENTS

| | | | | |
|---|---|---|---|---|
| 3,461,954 A | * | 8/1969 | Banks et al. ................ | 165/277 |
| 4,301,789 A | * | 11/1981 | Artweger .................... | 126/585 |
| 4,314,008 A | * | 2/1982 | Blake ............................ | 429/8 |
| 4,591,692 A | * | 5/1986 | Wightman .................. | 219/209 |
| 4,667,140 A | * | 5/1987 | Sweetman .................. | 318/696 |
| 4,702,506 A | * | 10/1987 | Iimura ...................... | 292/251.5 |

(Continued)

FOREIGN PATENT DOCUMENTS

JP    62-234878    10/1987

(Continued)

OTHER PUBLICATIONS

English translation to JP 62-234878 (1987).*

*Primary Examiner*—Akm E Ullah
*Assistant Examiner*—Samuel Berhanu
(74) *Attorney, Agent, or Firm*—McDermott Will & Emery LLP

(57) ABSTRACT

The present invention provides battery storing device (100) that can easily suppress temperature increase in a battery and a battery storing section in high-temperature using environment, without damaging excellent heat retaining function of the battery that is required for low-temperature using environment. Battery storing device (100) has battery storing box body (2), battery storing section (30) in the box body, and battery group (1) stored in battery storing section (30). Battery storing box body (2) is made of heat insulating material and has a heat retaining function of battery group (1). Battery storing device (100) further has lid body (3), opening/closing lid body (6) for opening and closing opening (5) for releasing the heat retaining function, magnetic material (7) disposed at an end of opening/closing lid body (6), electromagnet (8), and electromagnet (9).

14 Claims, 5 Drawing Sheets

U.S. PATENT DOCUMENTS

| | | | | |
|---|---|---|---|---|
| 5,202,200 A | * | 4/1993 | McMillan et al. | 429/187 |
| 5,585,204 A | * | 12/1996 | Oshida et al. | 429/62 |
| 5,994,669 A | * | 11/1999 | McCall | 219/209 |
| 6,304,061 B1 | * | 10/2001 | Toya | 320/134 |
| 6,781,349 B2 | * | 8/2004 | Kimura et al. | 320/150 |
| 6,826,792 B2 | * | 12/2004 | Lin | 5/421 |
| 2002/0079865 A1 | * | 6/2002 | Thomas et al. | 320/136 |
| 2004/0061480 A1 | * | 4/2004 | Kimura et al. | 320/150 |

FOREIGN PATENT DOCUMENTS

| | | |
|---|---|---|
| JP | 8-22845 | 1/1996 |
| JP | 8-303683 | 11/1996 |
| JP | 10-64597 | 3/1998 |
| JP | 11-273717 | 10/1999 |
| JP | 2001-317686 | 11/2001 |
| JP | 2002-63947 | 2/2002 |
| JP | 2003-007356 | 1/2003 |

* cited by examiner

BATTERY RECEIVING DEVICE, POWER SOURCE DEVICE USING THE SAME, AND ELECTRIC MOTOR VEHICLE USING THE DEVICES

TECHNICAL FIELD

The present invention relates to a battery storing device capable of storing a battery inside, a power supply device using it, and an electric vehicle using them. Especially, the present invention relates to a battery storing device and power supply device appropriate to use a battery in widespread environment from high temperature to low temperature in an electric automobile or the like.

BACKGROUND ART

Recently, for addressing environmental issues and energy problems, an automobile that uses output from a secondary battery as the driving source and at least partially has an electrically driven device has received attention.

Such an electric automobile uses output from the secondary battery as the entire driving source, and is run by driving force of a motor. A so-called hybrid car system that concurrently uses a motor and an engine and a so-called idle stop system car proceed toward commercialization in some manufacturer. Here, the so-called idle stop system car means a car where idling is stopped at parking time and the electric power of the motor assists the engine power at a restart time In the electric automobile, instead of a special battery such as a fuel cell or a sodium sulfur battery operated in a special high-temperature region, a lead acid storage battery, a nickel-hydrogen storage battery, or, recently, a lithium secondary battery including organic electrolyte is employed in a relatively many cases. That is because these batteries can be operated in a normal temperature region, and is safe, easy-to-handle, and economical.

While, the characteristic of a secondary battery and the reliability including the lifetime and safety largely depend on the battery and its environmental temperature, and affect the characteristic and reliability of the vehicle to which the battery is mounted.

It is preferable to place the battery in an environmental condition where ambient temperature is higher than 30° C. in view of the output power characteristic. When the ambient temperature decreases, the output power largely decreases comparing with that in the preferable temperature region and a traveling characteristic of the vehicle decreases.

In view of the lifetime characteristic of the battery, it is preferable that the ambient temperature is lower than 40° C. When the ambient temperature exceeds 40° C., the self-discharge increases. Especially, the lithium secondary battery remarkably depends on temperature, the output characteristic and safety thereof are apt to be affected by the ambient temperature.

When the lithium secondary battery is used for example, the energy obtained under the environment at 0° C. is 60% to 70% of the output energy at ambient temperature of 30° C. to 40° C., and the energy obtained at −20° C. is about 10%. When the lithium secondary battery is used or left for a long time at a higher ambient temperature of 60° C., the organic electrolyte from a safety valve dissipates, or the sealing mechanism breaks. These phenomena cause inconvenience in safety of the characteristic and reliability. The other normal-temperature-type batteries such as a lead acid storage battery and a nickel-hydrogen storage battery have a similar tendency more or less.

A conventional cooling mechanism such as a compressor has a complex mechanism and requires much energy. In the electric automobile, therefore, emphasis is generally laid on heat retaining property at a low temperature, and a configuration considering securement of a battery characteristic is employed. However, practical application to a high temperature environment is kept at a distance, and the general purpose property is apt to be restricted.

In a vehicle that uses output from a normal-temperature-type battery as the power supply and has an electrically driven system in any way, a design for optimizing the output from the battery during traveling especially in a low temperature environment is employed. For example, a battery storing box having an insulating function as high as possible is produced and temperature of the battery or in the battery storing box is controlled using various heat sources.

Japanese Patent Unexamined Publication No. H8-22845 (pages 3-7, FIG. 1 or the like), for example, discloses the following configurations:

a battery is surrounded by a double outer wall including a vacuum layer;

a combustion heater or the like is installed in a circulation route of radiator water, and a battery is heated or cooled using the heater; and the temperature of the battery is controlled using a panel heater that is installed on a heat retaining member wall and has a positive temperature coefficient (PTC) device or a nichrome wire.

Here, the PTC device is used as a heating mechanism and has resistance variation coefficient having a positive characteristic with respect to temperature.

Japanese Patent Unexamined Publication No. 2003-7356 (pages 4-7, FIG. 1 or the like) discloses a mechanism where a thermal converting device having Peltier effect is disposed on a wall surface of a battery box made of vacuum heat insulating material, and heats and cools the battery in the battery box.

An electric automobile including an electrically driven device has a battery storing box, and controls environmental temperature of the battery and the battery storing box with any means. Furthermore, it is considered that an output characteristic of the battery is especially important for controlling the environmental temperature, and the battery storing box includes a heat retaining box having high heat retaining property that is obtained by employing heat insulating material having high heat insulation property.

It is conventionally known that a vacuum heat insulating material has high insulating effect as the heat insulating material. Various vacuum heat insulating materials having high practicality are developed, and each of the materials is formed of a core material and an exterior package such as plastic laminated film. Here, the core material is formed of the following materials:

a hollow body of polyurethane foam, glass, or a metal plate;

a hollow body including a resin molded body as the wall material;

powder or fiber such as glass wool or silica; or continuous foam such as polyurethane foam.

Japanese Patent Unexamined Publication No. 2001-317686 (pages 3-4, FIG. 1 or the like) discloses a new manufacturing method of heat insulating material using the core material and the plastic laminated film. In this manufacturing method, decompression and sealing are established by laminated film having thermally welded resin on mutually facing surfaces. Thus, spaces having lightweight and high heat insulation property can be formed in various forms, and the vacuum heat insulating material is easily applied to the battery storing box for an electric automobile. When the electric automobile is required to be applicable to widespread temperature environment and quality of the heat insulating material and the manufacturing technology are improved, however, a new issue becomes apparent related to high temperature control of the battery or the battery storing box.

The battery storing box having high insulating and heat-retaining property exerts a preferable insulating characteristic, especially in low temperature environment. However, the battery itself is a heating element having high heat capacity, and generates heat by charge or discharge. When high output is continued for a long time, temperatures in the battery and the battery storing box rapidly increase.

The temperature in the battery storing box, after rising to a high temperature, does not easily decrease because the inside has high insulating characteristic. The battery is therefore left in an undesired high temperature state. When the temperature in the using environment of the automobile becomes high and the heat retaining function becomes high, the heat retaining function works reversely and the battery storing box hardly releases heat. Therefore, even when the electric automobile stops, the high temperature state is kept for a long time. When the battery left in the high temperature state is discharged, the temperature increase accelerates and the temperature inside the battery storing box further increases.

When the battery is left in the high temperature state, a problem arises in the stability of the characteristic or securement of the safety of the battery. Especially, it is not preferable that the lithium secondary battery having organic electrolyte containing many vaporization components is left in the high temperature environment.

A conventional cooling mechanism using a compressor cannot be applied to an electric automobile during parking. A mechanism employing an electric compressor or a thermal converting device having Peltier effect consumes much energy, and is therefore inefficient.

For controlling temperatures in the battery and the battery storing box of the electric automobile, a new temperature controlling means capable of effectively avoiding danger at high temperature with less energy while keeping high heat retaining characteristic at low temperature is desired to be developed instead of the conventional cooling mechanism.

The present invention addresses the problems discussed above. The present invention provides a battery storing means capable of easily suppressing temperature increase in the battery storing section and the battery in high temperature environment without damaging the high heat retaining function required in low temperature environment.

DISCLOSURE OF THE INVENTION

A battery storing device of the present invention has a battery storing section and a heat-retention releasing mechanism. The battery storing section has a heat retaining function of a battery placed in it using heat insulating material, and the heat-retention releasing mechanism releases the heat retaining function.

The battery storing device having such a structure can prevent reduction of operation temperature of the battery with the battery storing section having the heat retaining function. The battery storing device can prevent the battery from extremely increasing in temperature with the heat retention releasing mechanism. Additionally, the battery storing device can produce a temperature environment appropriate to the battery, and can appropriately keep the output characteristic and safety of the battery.

In the battery storing device of the present invention, the heat insulating material may be a vacuum heat insulating material. The battery storing device using the vacuum heat insulating material has high heat insulation property and hence has higher heat retaining performance.

The battery storing device of the present invention has an independent discharge circuit that is directly connected to the battery and can perform a discharge operation independently from a charge/discharge operation of a main circuit.

The battery storing device having such a structure, even when it is left in low temperature environment for a long time and the temperature inside the battery storing section decreases, can perform the discharge operation with the independent discharge circuit independently from the discharge operation of the main circuit. As a result, the temperature inside the battery storing section can be prevented from decreasing.

In the battery storing device of the present invention, the independent discharge circuit has a heating resistor. The battery storing device having such a structure can efficiently increase the temperature inside the battery storing section when the heating resistor is disposed in the battery storing section.

In the battery storing device of the present invention, the independent discharge circuit has at least a PTC device. The PTC device is a resistance device where temperature coefficient of resistance variation is positive and varies logarithmically.

The battery storing device having such a device can efficiently increase the temperature inside the battery storing section using the PTC device, and can set the upper limit of the inside temperature.

The battery storing device of the present invention has a temperature detector for detecting the temperature inside the battery storing section and a circuit control section for controlling the independent discharge circuit in response to the temperature detected by the temperature detector.

The battery storing device having such a structure can prevent the temperature inside the battery storing section from becoming low using the circuit control section.

In the battery storing device of the present invention, the heat retention releasing mechanism has a mechanism for opening and closing an opening for making air flow between the inside and outside of the battery storing section.

The battery storing device having such a structure has a simple configuration but have the heat retention releasing mechanism.

In the battery storing device of the present invention, the heat retention releasing mechanism has a heat conductor for forming a heat conduction route and a mechanism for opening and closing the heat conduction route. The heat conduction route conducts heat between the inside and outside of the battery storing section.

The battery storing device of the present invention has a temperature detector for detecting the temperature in the battery storing section and a heat-retention release control section for controlling the heat-retention releasing mechanism in response to the temperature detected by the temperature detector.

The battery storing device having such a structure has the heat-retention release control section and hence can prevent the temperature inside the battery storing section from becoming high.

In the battery storing device of the present invention, the battery is a lithium secondary battery.

A power supply device of the present invention has a battery storing device and a battery stored in the battery storing device.

An electric vehicle of the present invention has a power supply device and an electrically driven mechanism for being driven by power supply from the power supply device.

The electric vehicle having such a structure is adaptable to widespread temperature environment without trouble, and can have improved vehicle characteristic and safety.

DETAILED DESCRIPTION OF PREFERRED EMBODIMENTS

Exemplary embodiments of the present invention will be described hereinafter with reference to the following drawings.

Exemplary Embodiment 1

Figure 1:
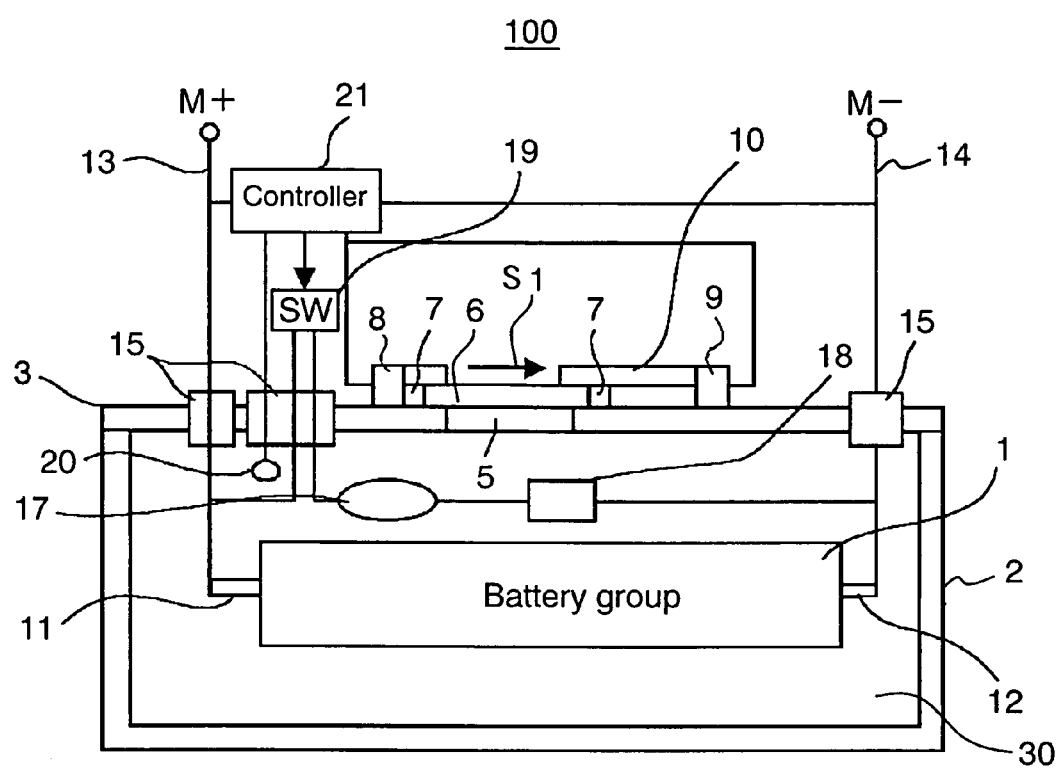
FIG. 1 is a diagram of a battery storing device in accordance with a first exemplary embodiment of the present invention.

FIG. 1 is a diagram of a battery storing device in accordance with exemplary embodiment 1 of the present invention. Battery storing device 100 has battery storing box body 2 capable of storing battery group 1 inside and lid body 3 of battery storing box body 2. Magnetic materials 7 are disposed at ends of opening/closing lid body 6. Battery storing device 100 has the following elements:

electromagnets 8 and 9 for opening and closing opening/closing lid body 6 in the direction indicated by code S1;

guide 10 for opening, closing, or moving opening/closing lid body 6;

PTC device 17; and resistance device 18 such as a nichrome wire that is a normal heating resistor. Battery storing device 100 also has switch 19, temperature detector 20, and controller 21 for controlling opening and closing of opening/closing lid body 6, PTC device 17, and resistance device 18.

Battery storing box body 2, lid body 3, and opening/closing lid body 6 are made of heat insulating materials. These bodies may be entirely made of the heat insulating materials, or may be partially made of a member other than the heat insulating materials.

Positive-electrode-side total terminal 11 and negative-electrode-side total terminal 12 of battery group 1 are connected to terminals "M+" and "M−" of a main circuit of a power supply device through conductor wires 13 and 14, respectively. Conductor wires 13 and 14 penetrate parts of lid body 3.

PTC device 17 is a resistor device that is called a PTC element or a PTC heater. In PTC device 17, the variation coefficient of the resistance with respect to temperature is positive, and the resistance logarithmically varies. PTC device 17 can set Curie point. PTC device 17 has a characteristic where the resistance increases at a temperature exceeding the Curie point to automatically stop heat generating current. Resistance device 18 is connected to conductor wire 13 through PTC device 17 and switch 19, and conductor wire 13 electrically connects to positive-electrode-side total terminal 11 of battery group 1. Resistance device 18 is also connected to conductor wire 14 electrically connecting to negative-electrode-side total terminal 12 of battery group 1.

Box through sections (not shown) through which conductor wires 13 and 14 penetrate are sealed by heat insulating sealing materials 15.

Controller 21 controls opening and closing of opening/closing lid body 6 by operating electromagnets 8 and 9 in response to the temperature detected by temperature detector 20. Controller 21 controls the turning on/off of switch 19 in response to the detected temperature and determines whether or not to operate PTC device 17 and resistance device 18.

Battery group 1 can be stored-in battery storing box body 2 using battery storing box body 2 and lid body 3, and battery storing section 30 having a heat retaining function of battery group 1 using heat insulating material is formed. The shape of battery storing section 30 and configuration having a double or triple heat insulating structure can be set in consideration of the space and weight, and hence are so called issues in design.

A heat retention releasing mechanism for releasing the heat retaining function of battery storing section 30 is formed of opening/closing lid body 6, electromagnets 8 and 9, and guide 10. Here, opening/closing lid body 6 opens and closes opening 5, and opening 5 is used for making air flow between the inside and outside of battery storing section 30 and is disposed in the wall surface of battery storing section 30.

A heat retaining mechanism and the heat retention releasing mechanism of battery storing device 100 having such a configuration are described hereinafter.

In FIG. 1, when electric current flow to operate electromagnet 8 and operation of electromagnet 9 is stopped, force of electromagnet 8 for attracting magnetic material 7 makes opening/closing lid body 6 cover opening 5. At this time, battery storing section 30 for storing battery group 1 obtains a space region surrounded by heat insulating material and provides a high heat retaining function.

When operation of electromagnet 8 is stopped and electric current flows to operate electromagnet 9, force of electromagnet 9 for attracting magnetic material 7 moves opening/closing lid body 6 to open opening 5. At this time, battery storing section 30 is opened toward the outside, heat in it is released to the outside, and the heat retaining function is released.

The heat retaining mechanism or heat retention releasing mechanism is selected by a manual operation or an operation of controller 21. Controller 21 works in response to the temperature detected by temperature detector 20 disposed in battery storing section 30.

Next, a heating mechanism is described hereinafter. In FIG. 1, a discharge circuit directly connected to battery group 1 is formed of PTC device 17, resistance device 18, and switch 19. This discharge circuit is an independent discharge circuit that can discharge electricity with switch 19 independently from a charge/discharge operation of the main circuit having the terminals "M+" and "M−"

In battery storing device 100, the heat retaining function is secured by using heat insulating material in battery storing box body 2 or the like. However, keeping the heat retaining function for a long time has a limit. Therefore, practically, heat dissipation cannot be avoided perfectly. When the battery is left for a long time during stopping after travel of the electric automobile, for example, temperature in battery storing box body 2 or battery group 1 decreases. When the temperature extremely decreases in the situation discussed above, the output power of the battery decreases and the traveling performance of the electric automobile decreases. The decrease of the ambient temperature of the battery must be therefore suppressed. A suppressing mechanism of temperature decrease is important for retaining heat in the electric automobile during stopping, especially in low temperature environment. It is important that this mechanism can be operated independently from the main circuit of the driving system. It is effective that the independent discharge circuit is employed as the suppressing mechanism of excessive temperature decrease.

The independent discharge circuit is operated in FIG. 1 by the following steps:

controller 21 takes the temperature in battery storing box body 2 detected by temperature detector 20; and switch 19 is flipped on or off using a predetermined temperature as a threshold value.

A manual switch function may be disposed in controller 21. In the manual switch function, heating of the inside of battery storing box body 2 is selected, or a timer function is started to avoid an excessive operation of a heating circuit in response to a using situation by starting.

PTC device 17 and resistance device 18 are used as heating elements. However, the battery in itself is a heating element, so that, as one of alternatives, one or both of PTC device 17 and resistance device 18 used as heating elements may be disposed outside battery storing box body 2 or may be omitted.

PTC device 17 can automatically stop the discharge at an upper limit of achieved temperature by setting the Curie point. PTC device 17 can be installed inside battery storing box body 2 or the boundary surface between the inside and the outside thereof, where the inside temperature can be sensed. Thus, an upper limit of the temperature inside battery storing box body 2 can be set. Consumption of excessive energy for heating can be suppressed. An accidental failure of temperature detector 20 can be also countered. PTC device 17 may be always directly connected to the battery to form an independent discharge circuit.

Next, heat insulating material is described hereinafter. In extremely low temperature environment, a high heat retaining effect in the configuration of battery storing section 30 is required. In high temperature environment, the heat retention releasing function is required when the heat retaining function is high. In other words, heat dissipation is required in the high temperature environment, heat retention is required in the low temperature environment, and thus a contradiction arises.

In exemplary embodiment 1, however, no matter how high heat retaining configuration is disposed, a mechanism for releasing a heat retaining function allows release of the heat retaining function in a short time by small output.

As a result, in the battery storing device of exemplary embodiment 1, even when excellent heat insulating material produces a function preferable to heat retention, extremely-high temperature environment can be easily avoided. In other words, arbitrary heat insulating material can be applied, and especially excellent heat insulating material can be effectively used. Application of the heat insulating material having high heat insulating function allows achieving of both heat retention at low temperature and safety at high temperature, and hence the application of the heat insulating material is preferable.

In exemplary embodiment 1, polyurethane foam of independent air bubble always used as vacuum heat insulating material can be also used. Recently, vacuum heat insulating materials that are light and has high heat insulation property have been developed. These vacuum heat insulating materials are formed by grappling polyurethane foam of continuous air bubble in laminated film, and by thermally sealing them in a vacuum furnace at 0.1 to 0.5 Torr. Here, the grappling may be performed independently, or together with glass wool, silicon powder, and urethane foam fiber. The configurations using these vacuum heat insulating materials are preferable as components of an automobile that is desired to be lightened. Especially, a vacuum heat insulating material formed of combinations of communicating-urethane vacuum heat insulating material and cyclopentane-formulated urethane foam is light and has high degree of freedom in shape setting. These vacuum heat insulating materials have high heat insulating effect even when their thicknesses are several mm or shorter, so that the materials are extremely preferable for forming battery storing device 100 employing an electrically driven device. These vacuum heat insulating materials can establish a heat retaining characteristic at low temperature without damaging the characteristic and safety at high temperature.

In battery storing device 100 of exemplary embodiment 1, the battery can be stored in battery storing box body 2. Battery storing device 100 has the following elements:

battery storing section 30 having a heat retaining function of the battery in it using heat insulating material; and a heat retention releasing mechanism for releasing the heat retaining function. Therefore, battery storing device 100 can select two functions, namely the heat retaining function and the heat retention releasing function. This configuration can effectively provide environment preferable for the battery, and allows not only effective exertion of functions of the battery but also securement of lifetime and safety.

In the configuration of exemplary embodiment 1, the heat retaining function at low temperature is formed using especially excellent heat insulating material, and the releasing function of the heat retaining function allows the battery to be released from an undesired high-temperature environment in an extremely short time. The energy consumption for this operation can be limited to extremely low consumption at either of low temperature and high temperature.

Installing battery group 1 on the bottom surface in battery storing box body 2 is one of a design issue and an arbitrary issue for persons skilled in the art. The following configuration is preferable:

the temperature of battery group 1 and the temperature inside battery storing box body 2 are approximated to each other as closely as possible; and for increasing efficiency of the temperature control, a rib or a bar are disposed on the bottom surface of battery storing box body 2 and a gas flow section is disposed in a lower part of battery group 1.

Temperature detector 20, PTC device 17, and resistance device 18 may be disposed at predetermined positions in battery group 1 and battery storing box body 2, in response to a more precisely controlled part and control purpose. Set temperatures for setting the heat retaining function and heat retention releasing mechanism can be arbitrarily set in response to the characteristic or the like of the battery.

Exemplary Embodiment 2

Figure 2:
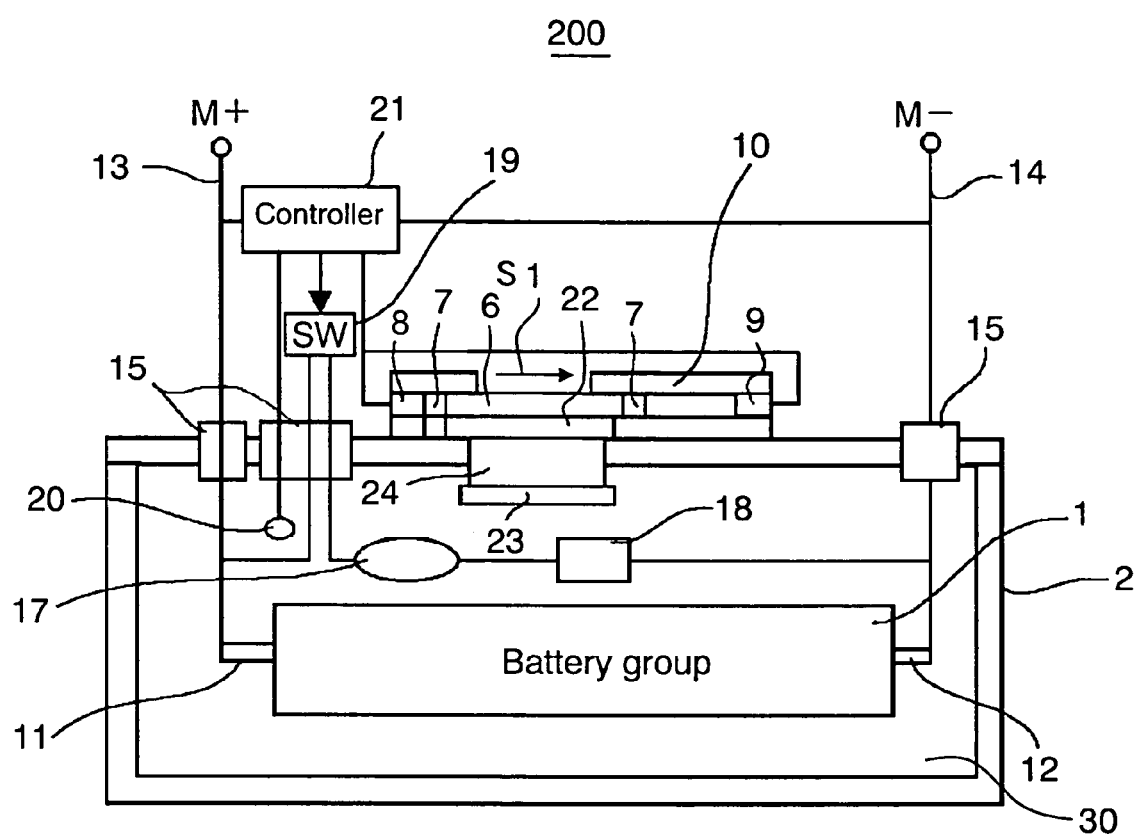
FIG. 2 is a diagram of a battery storing device in accordance with a second exemplary embodiment of the present invention.

FIG. 2 is a diagram of battery storing device 200 in accordance with exemplary embodiment 2 of the present invention. Battery storing device 200 has a heat-retention releasing mechanism different from that of exemplary embodiment 1.

In FIG. 2, battery storing device 200 has the following elements:
- battery storing box body 2 capable of storing battery group 1 inside;
- lid body 3;
- opening/closing lid body 6;
- electromagnets 8 and 9;
- guide 10;
- PTC device 17;
- resistance device 18;
- switch 19;
- temperature detector 20;
- controller 21;
- fins 22 and 23 for heat dissipation or heat collection; and
- heat conduction body 24 for conducting heat between fins 22 and 23.

Here, configurations except fins 22 and 23 and heat conduction body 24 are the same as those of exemplary embodiment 1, and the description of the configurations is omitted.

Fins 22 and 23 and heat conduction body 24 constitute a heat conductor forming a heat conduction route for conducting heat between the inside and outside of battery storing section 30. Opening/closing lid body 6, electromagnets 8 and 9, and guide 10 constitute a mechanism for opening and closing the heat conduction route. In exemplary embodiment 2, a heat retention releasing mechanism of heat conduction type for releasing a heat retaining function is formed of the heat conductor and the mechanism for opening and closing the heat conduction route.

In this configuration, when the upper part of fin 22 is covered by opening/closing lid body 6, the inside of battery storing section 30 has a space region surrounded by heat insulating material, and a heat retaining function is formed. When opening/closing lid body 6 moves in the direction of code S1 to release the covering of the upper part of fin 22, fin 22 is exposed to the outside air. The heat inside battery storing section 30 is collected by fin 23, and the heat is dissipated to the outside from fin 22 through heat conduction body 24.

As materials used for fins 22 and 23 and heat conduction body 24, aluminum having high heat conductivity, metal such as copper, or electrically conductive oxide are preferably used. Especially, aluminum is light and has high heat conductivity, so that it is effective to control the heat retaining function.

In the configuration using the heat retention releasing mechanism of heat conduction type, the heat retention releasing effect is slightly lower than that in the configuration using opening 5, and battery storing section 30 having high strength can be formed advantageously.

In exemplary embodiment 2, the mechanism for opening and closing the conduction route for conducting heat between fin 22 and the outside have been described. A mechanism for opening and closing the heat conduction route of the heat conductor between the inside and outside of battery storing section 30 is not limited to this. For example, a mechanism for opening and closing the conduction route for conducting heat between fin 23 and the inside of battery storing section 30 may be employed. A mechanism for opening and closing the heat conduction route by insulating, breaking, or combining heat conduction in the heat conductor formed of fins 22 and 23 and heat conduction body 24 may be employed.

Figure 3A:
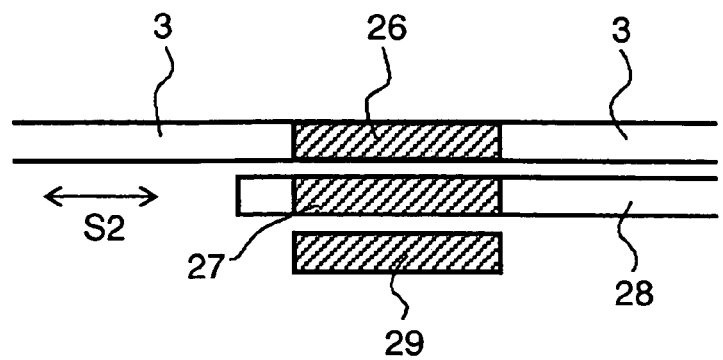
FIG. 3 is a diagram showing an example of a heat-retention releasing mechanism in accordance with the first or second exemplary embodiment of the present invention.

FIG. 3A is a schematic sectional view of the heat retention releasing mechanism in accordance with exemplary embodiment 1 or exemplary embodiment 2. In FIG. 3A, the heat conductor has heat conduction body 26 disposed in an opening in lid body 3 and has heat conduction body 29 disposed inside heat conduction body 27, heat insulation body 28, and battery storing section 30. Heat conduction body 27 is bonded to heat insulation body 28, and can be moved left as shown by code S2 in the front view of FIG. 3A.

Figure 3B:
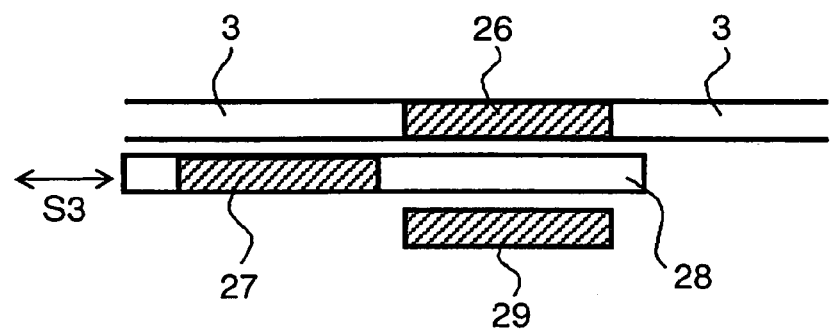

FIG. 3B shows a state provided after heat conduction body 27 is moved in the direction of code S2 from the state shown in FIG. 3A. In other words, when heat conduction body 27 is moved in the direction of code S2, heat insulation body 28 is positioned between heat conduction body 26 and heat conduction body 29. Thanks to this configuration, heat insulation body 28 can block the heat conduction route of the heat conductor. When heat conduction body 27 is moved right in the front view of FIG. 3B, heat conduction body 27 is returned to the state shown in FIG. 3A, and hence the heat conduction route is connected to conduct heat with the heat conductor.

In exemplary embodiment 1 and exemplary embodiment 2, the heat retention releasing mechanism may have opening 5 as shown in FIG. 1. Heat conduction body 24 as a conductor of heat may be disposed between the inside and outside of battery storing section 30 as shown in FIG. 2, and the heat conduction route may be disconnected or connected by an arbitrary means. The heat retention releasing mechanism can be selected in a range known by persons skilled in the art. The configuration where opening 5 is disposed and a mechanism for opening and closing opening 5 is provided as shown in FIG. 1 is the simplest and is easy-to-design, so that the configuration is preferable.

Opening/closing lid body 6 is opened and closed using an electromagnet in embodiment 1 or embodiment 2; however, a mechanism such as a motor, a spring, a cylinder, or a lever may be used.

Figure 4:
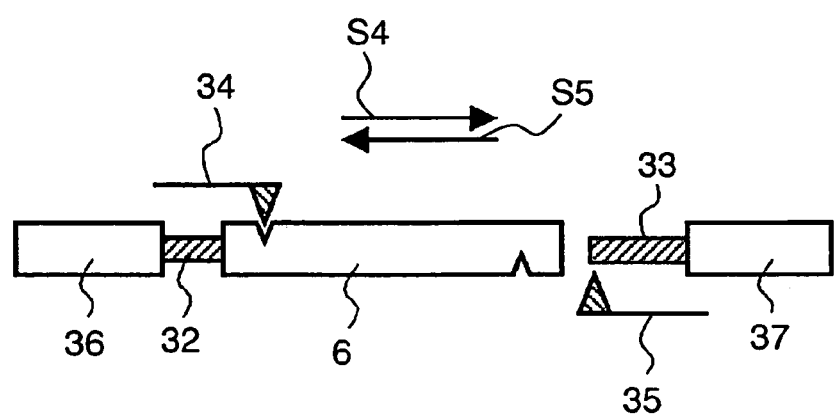
FIG. 4 is a diagram illustrating an opening/closing mechanism of an opening/closing lid body in accordance with the first or second exemplary embodiment.

FIG. 4 shows another configuration of opening/closing lid body 6. This configuration has solenoids 36 and 37 and electromagnets 32 and 33. Opening/closing lid body 6 can be opened and closed by moving electromagnets 32 and 33 in the direction of code S4 or S5 by turning on or off the current flowing through solenoids 36 and 37. Claws 34 and 35 for temporarily fixing opening/closing lid body 6 are disposed for preventing continuous electric conduction to solenoids 36 and 37 in FIG. 4.

The opening/closing direction of opening/closing lid body 6 is also arbitrary. For example, lid body 6 may be opened and closed using a hinge or the like.

In embodiment 1 or embodiment 2, the heat retention releasing mechanism is disposed on the upper surface (lid body 3) of battery storing section 30. Setting of an installation position, size, and the number of heat retention releasing mechanisms is one of issues in design. For example, the heat retention releasing mechanism is disposed on at least the upper part of battery storing section 30, more preferably at a position between the top of battery storing section 30 and half height of battery storing section 30. This configuration is effective for fast discharging high-temperature air. The configuration where the heat retention releasing mechanism has a fan is preferable for improving effect of releasing the heat retention function. Specifically, when opening/closing lid body. 6 is moved to the opening position, hot air inside battery storing section 30 is efficiently discharged using the fan.

The opening-type heat retention releasing mechanism of embodiment 1 and the heat retention releasing mechanism of heat conduction type of embodiment 2 may be used together, or they may be used together with another arbitrary heat retention releasing mechanism.

Battery storing device 100 or 200 of embodiment 1 or embodiment 2 and the battery stored in it allow forming of a power supply device having a using form different from that of the conventional battery storing device. In embodiment 1 or embodiment 2, a case where the power supply device is loaded on an electric automobile is mainly described.

The power supply device, however, can be used for power supply in an electric vehicle having an electrically driven mechanism (for example, a motor) driven by electric power. The vehicle having the electrically driven mechanism is not limited to an electric automobile, but may be an electric motorcycle or an electric vehicle traveling on a track, for example. The power supply device can be applied to a vehicle other than the electric vehicle, for example, a ship or the like.

(Test 1)

For verifying performance of battery storing device 100 of embodiment 1 and battery storing device 200 of embodiment 2, three tested sets of the battery storing devices and a conventional battery storing device (not shown) are prepared and charge/discharge cycle tests are performed on the devices at environment temperature 35° C.

For preparing tested set A of the present invention, battery storing device 100 of embodiment 1 shown in FIG. 1 is produced in the procedure discussed below. In other words, communicating bubble urethane is used as a core material in a member used for a wall surface of battery storing box body 2 of battery storing device 100.

Next, this core material is grappled by laminated resin film, they are welded in vacuum at 0.5 Torr in this grappled state, and a heat insulating material plate with thickness of 3 mm is produced. This heat insulating material and cyclopentane-formulated urethane foam are insert-molded to form a composite heat insulating plate with thickness of 5 mm. This composite heat insulating plate is used as the wall surface of battery storing box body 2.

The upper surface of battery storing device 100, namely the upper surface of battery storing box body 2, is provided with 100 mm long and 50 mm wide opening 5 connecting to the outside. A slide lid body 3 having a shape for covering opening. 5 is formed on opening 5 by using the composite heat insulating plate. Magnetic materials 7 are buried under both ends of opening 5, and opening 5 can be opened and closed by electromagnets 8 and 9. A lithium secondary battery of 30 kWh is stored as battery group 1 in battery storing device 100 produced in this manner.

In battery storing section 30, as shown in FIG. 1, PTC device 17, resistance device 18, and switch 19 are connected in series to form a heating circuit (independent discharge circuit), and the heating circuit is connected to a main circuit of battery group 1. Temperature detector 20 is disposed in battery storing box body 2, connection is performed so that the temperature detected by temperature detector 20 is fed into controller 21, and controller 21 operates switch 19 and electromagnets 8 and 9.

For preparing another tested set B of the present invention, battery storing device 200 of embodiment 2 shown in FIG. 2 is produced in the procedure substantially similar to that for battery storing device 100.

Battery storing device 200 is different from battery storing device 100 in that battery storing device 200 has fins 22 and 23 and heat conduction body 24. The configurations of the other parts are substantially the same as those of battery storing device 100, so that the description is omitted.

A conventional battery storing device is prepared as tested set C (not shown) for comparing it with tested set A and tested set B of the present invention. Tested set C is different from tested set B shown in FIG. 2 in that tested set C has no opening 5 and no PTC device 17. The other configurations are substantially the same as those of battery storing device 100 or 200.

After preparing three tested sets A, B and C, common environmental condition of these three tested sets is set as follows. Releasing temperature of the heat retaining functions of tested sets A, B and C is set at 40° C., and restoring temperature of the heat retaining functions is set at 35° C. Releasing temperature of the heating circuit is set at 35° C., and restoring temperature of the heating circuit is set at 30° C. Curie point of PTC device 17 is set at 35° C.

Next, each of three tested sets A, B and C is installed in an environmental test device. As an installation condition, a pattern formed of 50 km/h of travel of an automobile, temporary stop, re-travel, charge, and leaving is assumed. Charge and discharge are repeated at environmental temperature of 35° C. and 0° C. in the pattern formed of one-hour discharge at 5 kW, one-hour leaving, one-hour discharge at 5 kW, 10-hour charge at maximum current five-hour rate, and 11-hour leaving. Here, the environmental temperature of 35° C. is assumed in consideration of use in a summer season or a hot district, the environmental temperature of 0° C. is assumed in consideration of use in a winter season or a cold district.

Figure 5:
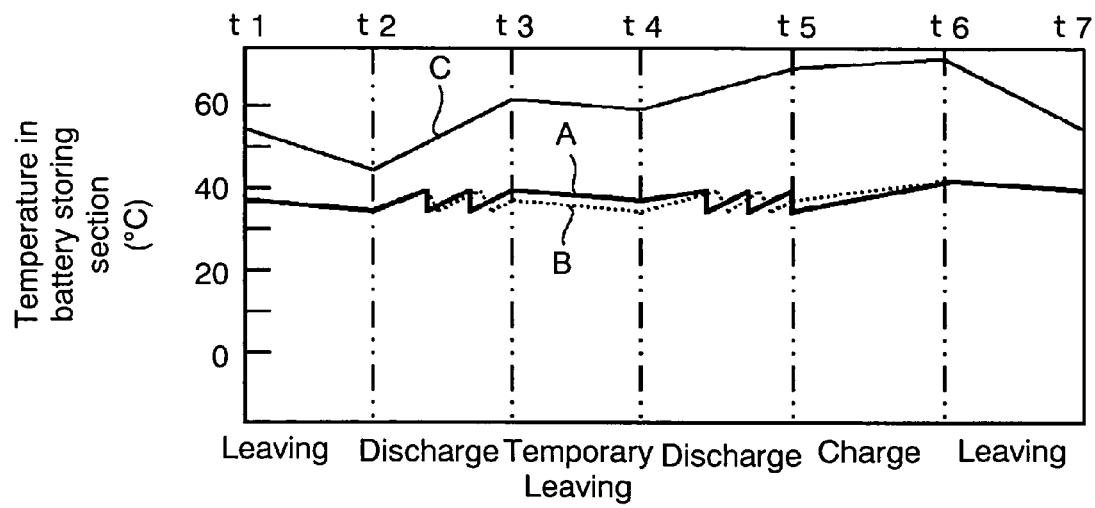
FIG. 5 shows temperature variation of the battery storing device in high temperature environment.

FIG. 5 shows typical temperature variation of battery storing section 30 in Test 1.

Code C in FIG. 5 shows temperature variation inside battery storing section 30 of tested set C of the conventional battery storing device, which does not employ the configurations of the present invention.

Tested set C is started to be left at time t1, and the discharge is started at time t2. During the discharge, the temperature in battery storing section 30 increases. Discharge is finished at time t3, and temporary leaving is performed between time t3 to time t4. Even when the temporary leaving is performed, heat dissipation little proceeds and hence temperature does not decrease because the heat retaining effect is high and outside air temperature is high. While discharge is performed again between time t4 and time t5, heat is generated again. Charge is performed between time t5 and time t6, and the temperature increases to a level exceeding 60° C. Tested set C is left between time t6 and time t7. However, because the heat retaining effect is high and outside air is hot, the temperature in battery storing section 30 does not decrease differently from the expectation. At the starting time of next discharge, therefore, high temperature environment that is not preferable for keeping the characteristic and safety is continuously kept.

In tested set A of the present invention, the temperature in battery storing section 30 is kept at about 35° C. during leaving between time t1 and time t2. The high output discharge is started at time t2. The temperature in battery storing section 30 increases with the discharge starting and reaches 40° C. When the temperature reaches 40° C., however, the heat retention releasing mechanism of the present invention operates, the temperature instantly decreases, the heat retaining mechanism and restoring mechanism having set temperature of 35° C. operate. Thus, the temperature in battery storing section 30 is kept in a desired temperature range of 35° C. to 40° C.

During temporary leaving between time t3 and time t4, the temperature slightly decreases. In response to discharge start at time t4, the temperature in battery storing section 30 increases. When the temperature reaches 40° C., the heat retaining mechanism and restoring mechanism operate again. During discharge between time t4 and time t5, the temperature in battery storing section 30 is kept to be 35° C. to 40° C. Charge is performed between time t5 and time t6, but the temperature is kept to be 40° C. or lower even when the charge causes heat generation. During leaving between time t6 and time t7, the temperature in battery storing section 30 slightly decreases and reaches 35° C.

Another tested set B of the present invention has substantially the same behavior as that of tested set A as shown by code B in FIG. 5. The detailed description of tested set B is omitted.

(Test 2)

Three respective tested sets A, B and C mainly including battery storing device 100 of embodiment 1, battery storing device 200 of embodiment 2, and a conventional battery storing device (not shown) are prepared, and charge/discharge cycle tests are performed at environment temperature 0° C.

Test 2 differs from Test 1 in environment temperature. The environment temperature is set at 35° C. in Test 1, while in Test 2 the environment temperature is set at 0° C., namely low temperature environment. The other conditions are the same as those of Test 1, so that the detailed description is omitted.

Figure 6:
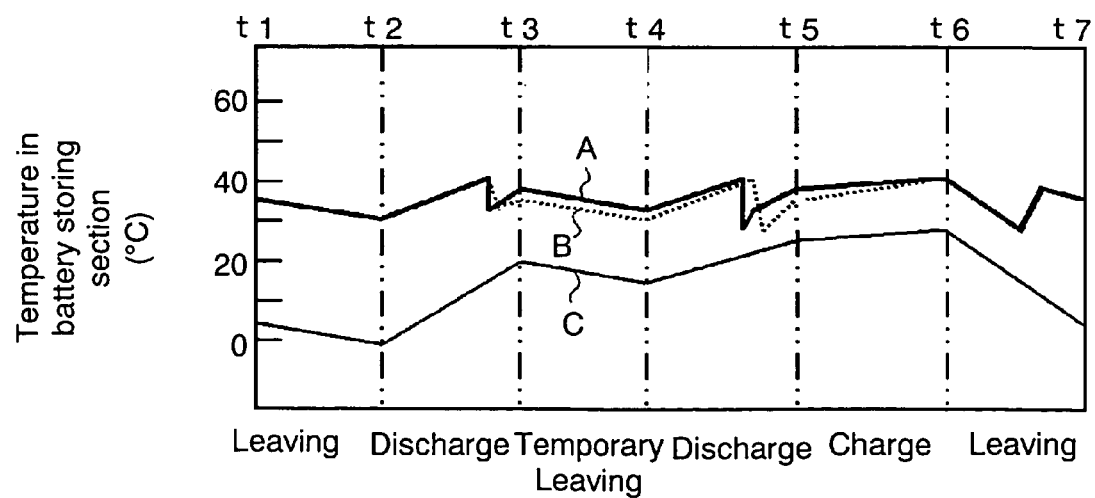
FIG. 6 shows temperature variation of the battery storing device in low temperature environment.

FIG. 6 shows typical temperature variation in battery storing device 30 in Test 2. Temperature variation in battery storing device 30 of tested set C (code C) of the conventional battery storing device that does not employ configurations of the present invention is described hereinafter.

During leaving between time t1 and time t2, the temperature in battery storing section 30 decreases to 0° C., namely outside air environmental level. The temperature increases in response to the start of high output discharge at time t2, but time t3 is taken until the temperature returns to a temperature appropriate to discharge During temporary leaving between time t3 and time t4, high heat retaining effect is obtained. Discharge between time t4 and time t5 and charge between time t5 and time t6 increase the temperature in battery storing section 30. In the leaving time period between time t6 and time t7, however, the temperature in battery storing section 30 decreases to an undesired low-temperature region, and discharge in a desired temperature range cannot be started.

In a heating circuit of tested set A of the present invention which employs PTC device 17, resistance device 18, and switch 19, as shown by code A, the temperature in battery storing section 30 is kept at 30° C. or higher of environmental temperature suitable for discharge output during leaving between time t1 and time t2. That is because the heat retaining function of heat insulation body 28 and the function of the heating circuit work.

The temperature in battery storing section 30 increases in response to discharge start at time t2, comes into a temperature region suitable for discharge in the early stage of the discharge, and temporarily reaches 40° C. level before time t3. This temperature decreases in a short time by operation of the heat retention releasing mechanism, but the temperature increases slightly before time t3. In the temporary leaving time period between time t3 to time t4, the heat is retained, but the temperature slightly decreases.

In response to discharge restart at time t4, the temperature in battery storing section 30 increases, and charge between time t5 and time t6 further increases the temperature. In the leaving time period between time t6 and time t7, the temperature in battery storing section 30 decreases in a midway time.

When the temperature decreases to 30° C. or lower, the temperature is increased by an operation of the heating circuit, and is controlled to be in a range of 30° C. to 35° C. by control of a controller responsive to the set Curie point of PTC device 17 and set information from the temperature detector.

Temperature variation in battery storing device 30 of tested set B, as shown by code B (broken line), is substantially the same as that of tested set A, though temperature following speed at the heat retention releasing point of tested set B is slightly slower in than that of tested set A (characteristic of code A).

(Test 3)

Three respective tested sets A, B and C mainly including battery-storing device 100 of embodiment 1, battery storing device 200 of embodiment 2, and a conventional battery storing device (not shown) are prepared. Charge/discharge tests are performed by 50 high-temperature (HT) cycles and 50 low-temperature (LT) cycles in two environments at a relative high temperature 35° C. and a relative low temperature 0° C., respectively.

Figure 7:
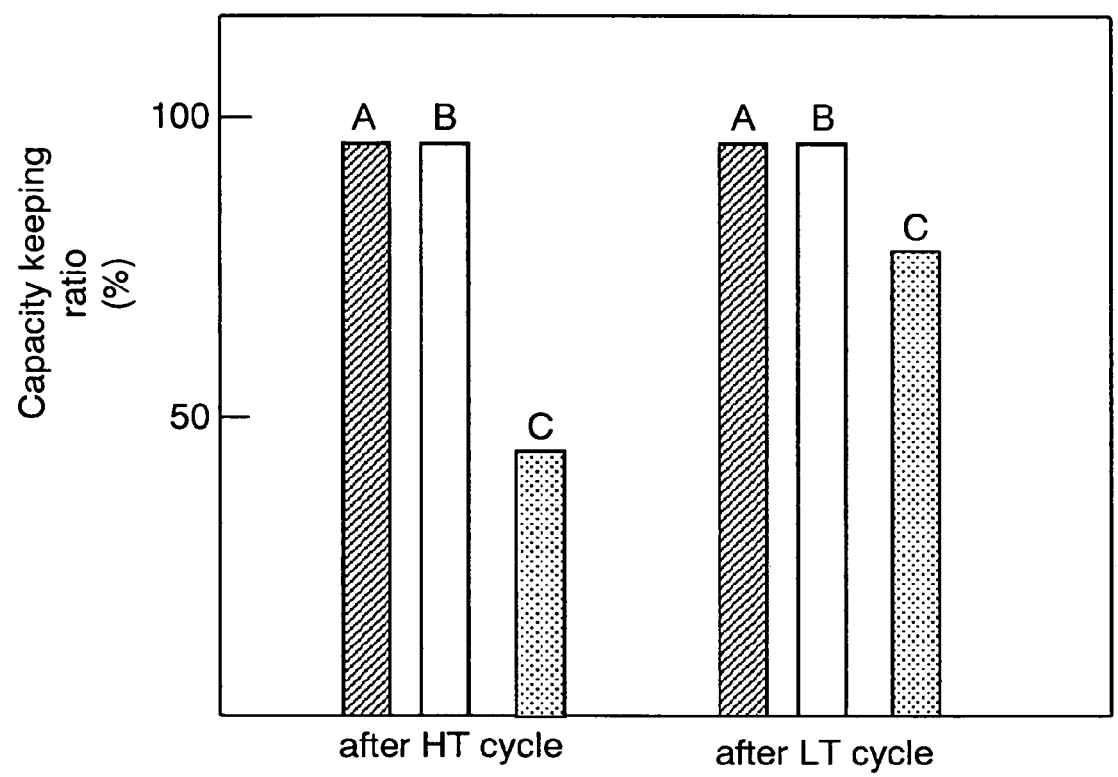
FIG. 7 shows discharge capacity of a battery after a charge/discharge cycle.

FIG. 7 shows capacity keeping ratios of battery group 1 after the cycle tests. Codes A, B and C shown in FIG. 7 are the same as those in FIG. 5 and FIG. 6. In other words, code A indicates capacity keeping ratios of battery storing device 100 shown in FIG. 1, code B indicates those of battery storing device 200 shown in FIG. 2, and code C indicates those of the conventional battery storing device (not shown).

After HT cycles (temperature 35° C.), the keeping ratio of battery capacity of conventional battery storing device (code C) is about 40%. While, respective keeping ratios of battery capacity of battery storing devices 100 (code A) and 200 (code B) are about 90%.

After LT cycles (temperature 0° C.), the keeping ratio of battery capacity of conventional battery storing device (code C) is about 70%. While, respective keeping ratios of battery capacity of battery storing devices 100 and 200 are about 90%.

In the HT cycle test, organic electrolyte dissipates from a safety valve in battery group 1 of the conventional battery storing device. Organic electrolytes do not dissipate in battery groups 1 of battery storing devices 100 and 200, respectively, differently from the conventional battery storing device.

In the LT cycle test, difference between tested sets A and B of the present invention and tested set C in electrolyte dissipation is less remarkable than that in the HT cycle test. However, decrease of the battery output characteristic of the conventional battery storing device is more remarkable than those of battery storing devices 100 and 200.

Test results of Test 1, Test 2, and Test 3 are summarized as follows.

The states of the conventional battery storing device in extremely hot environment and cold environment in Test 1 and Test 2 are shown by code C in FIG. 5 and FIG. 6. According to the test results, it is extremely difficult that the temperature in the conventional battery storing section is controlled into a temperature condition appropriate to the output, the keeping of the battery characteristic, and safety securement.

While, in embodiments 1 and 2, as shown by codes A and B in FIG. 5 and FIG. 6, the temperature in battery storing section 30 can be relatively easily controlled to a range suitable for stability of the output and characteristic or for safety.

According to test results in Test 3, the control functions of the temperatures in the battery storing sections in tested sets A and B have well effects on the reliability comparing with the conventional battery storing device (code C), as shown by.

codes A and B in FIG. 7. This fact can be observed from the capacity keeping ratios and battery states both after HT cycles and LT cycles.

Especially, the temperature control in high temperature environment is effectively performed by the heat retention releasing function, and the heat retention in low temperature environment is performed by application of excellent heat insulating material and the added heating mechanism.

The heating mechanism of the present invention can effectively use the battery itself as a heating element, when the heating mechanism is directly connected to the battery stored in the battery storing section. Thus, the heating effect is high, and the heat retention is efficient. For example, a heat retaining operation is advantageously allowed even during stopping independently from the main circuit used for traveling an electric automobile.

As discussed above, the present invention allows temperature in the battery storing section to be controlled in a range preferable to stability of the output and battery characteristic and reliability of the battery, in a widespread temperature environment in which a vehicle having an electrically driven device using output of the battery as a power supply travels.

The temperature control in high temperature environment is effectively performed by the heat retention releasing function, and the heat retention in low temperature environment is performed by application of excellent heat insulating material and the added heating mechanism. Additionally, battery reliability reduction in a high temperature region caused by the heat retaining function is concerned, but this concern can be eliminated by the heat retention releasing mechanism of the present invention.

The advantage of the present invention is not limited to the discussed items of the embodiments in a range that does not depart from the basic configuration of the present invention.

The present invention makes appropriate the temperature in the battery storing section of a vehicle having an electrically driven means, and the objective battery is not limited to a lithium secondary battery. It is apparent for persons skilled in the art that the objective vehicle is not limited to the vehicle having the electrically driven means.

INDUSTRIAL APPLICABLITY

The present invention can provide a battery storing device capable of easily suppressing temperature increase in a battery and a battery storing section in high-temperature using environment without damaging heat retaining function required for low-temperature using environment. The present invention can also provide a power supply device using it and an electric vehicle using them. Industrial applicability of them is therefore high.

The invention claimed is:

1. A battery storing device comprising:
   a battery storing section that can store a battery inside and has a heat retaining function of retaining heat of the battery that is stored inside using vacuum heat insulating material;
   a heat retention releasing mechanism for releasing the heat retaining function; and
   an independent discharge circuit having a heating resistor, whose resistance increases automatically, so that heat generating current stops,
   wherein the heat retention releasing mechanism opens and closes an opening for making air flow between the inside and outside of the battery storing section,
   said independent discharge circuit is electrically connected to the battery and can perform discharge independently from the charge/discharge operation of a main circuit, and
   is for suppressing the ambient temperature of the battery,
   wherein the heat retention releasing mechanism comprises: a heat conductor forming a heat conduction route for conducting heat between the inside and outside of the battery storing section; and
   a mechanism for opening and closing the heat conduction route,
   wherein said heat conductor has a first heat conduction body disposed in an opening in a lid body;
   a second heat conduction body bonded to a heat insulation body;
   a third heat conduction body,
   and the second heat conduction body is disposed between the first heat conduction body and the third heat conduction body.

2. A battery storing device according to claim 1, wherein the independent discharge circuit has at least a PTC device.

3. A battery storing device according to claim 1, further comprising: a temperature detector for detecting temperature inside the battery storing section; and a circuit control section for controlling the independent discharge circuit based on the temperature detected by the temperature detector.

4. A battery storing device according to claim 1, further comprising: a temperature detector for detecting temperature inside the battery storing section; and
   a heat-retention release control section for controlling the heat retention releasing mechanism based on the temperature detected by the temperature detector.

5. A battery storing device according to claim 1, wherein the battery is a lithium secondary battery.

6. A power supply device comprising: a battery storing device according to claim 1; and
   a battery stored in the battery storing device.

7. An electric vehicle comprising: a power supply device according to claim 6; and
   an electrically driven mechanism for being driven by power supply from the power supply device.

8. A battery storing device according to claim 1, wherein the vacuum heat insulating material is comprised of polyurethane foam grappled in laminated film.

9. A battery storing device according to claim 1, further comprising a plurality of heat conducting fins; and
   a heat conducting body located at said opening for conducting heat between said plurality of fins,
   wherein said heat conducting fins communicate with said heat conducting body.

10. A battery storing device according to claim 1, further comprising a fan located inside said battery storing section.

11. A battery storing device according to claim 1, wherein said battery storing device is installed in a vehicle.

12. A battery storing device according to claim 1, wherein said heat releasing retention mechanism comprises an opening/closing lid body, wherein magnetic materials are disposed at the ends of the opening/closing lid body.

13. A battery storing device according to claim 12, further comprising a claw for temporarily fixing the opening/closing lid body.

14. A battery storing device according to claim 9, wherein said heat conducting body is not directly attached to the battery.

* * * * *